(12) United States Patent  
Wang et al.

(10) Patent No.: US 11,816,251 B2  
(45) Date of Patent: Nov. 14, 2023

(54) METHOD FOR MANAGING DATA ASSET IN DATA BANK AND DATA BANK SYSTEM

(71) Applicant: Tsinghua University, Beijing (CN)

(72) Inventors: Jilong Wang, Beijing (CN); Qianli Zhang, Beijing (CN)

(73) Assignee: Tsinghua University, Beijing (CN)

( * ) Notice: Subject to any disclaimer, the term of this patent is extended or adjusted under 35 U.S.C. 154(b) by 316 days.

(21) Appl. No.: 17/242,939

(22) Filed: Apr. 28, 2021

(65) Prior Publication Data

US 2022/0004667 A1    Jan. 6, 2022

(30) Foreign Application Priority Data

Jul. 2, 2020    (CN) .......................... 202010634319.5

(51) Int. Cl.
*G06F 21/71* (2013.01)
*G06F 21/60* (2013.01)
*G06F 21/62* (2013.01)
*G06F 21/64* (2013.01)

(52) U.S. Cl.
CPC ............ *G06F 21/71* (2013.01); *G06F 21/602* (2013.01); *G06F 21/6218* (2013.01); *G06F 21/64* (2013.01)

(58) Field of Classification Search
CPC .... G06F 21/71; G06F 21/602; G06F 21/6218; G06F 21/64; G06F 21/44; G06F 16/27; G06F 21/45; H04L 9/0643; H04L 9/3239; H04L 9/50; G06Q 20/3829
See application file for complete search history.

(56) References Cited

U.S. PATENT DOCUMENTS

| | | | |
|---|---|---|---|
| 11,410,241 B2* | 8/2022 | Mitch | G06Q 10/00 |
| 2020/0145192 A1* | 5/2020 | Elkhiyaoui | G06Q 20/02 |
| 2020/0320518 A1* | 10/2020 | Simas | H04L 51/52 |
| 2022/0309501 A1* | 9/2022 | Guo | H04L 9/3247 |

* cited by examiner

*Primary Examiner* — Abiy Getachew
(74) *Attorney, Agent, or Firm* — Thomas| Horstemeyer, LLP

(57) ABSTRACT

A method for managing data asset in a data bank is provided, including: acquiring a confirmation authentication request, wherein the confirmation authentication request includes a data asset to be confirmed, characteristic information of the data asset and characteristic information of a data provider uploaded by the data provider; performing a confirmation verification on the data asset through a confirmation blockchain based on the data asset, the characteristic information of the data asset and the characteristic information of the data provider in response to the confirmation authentication request; storing confirmation information corresponding to the data asset into the confirmation blockchain after it is determined that the data asset has passed the confirmation verification; inserting identification data for tracing a data owner into the data asset, obtaining and storing the data asset having the identification data.

10 Claims, 4 Drawing Sheets

US 11,816,251 B2

METHOD FOR MANAGING DATA ASSET IN DATA BANK AND DATA BANK SYSTEM

CROSS-REFERENCE TO RELATED APPLICATION

The present application claims the priority of Chinese Patent Application No. 202010634319.5, filed to the CNIPA on Jul. 2, 2020, the content of which is hereby incorporated by reference.

TECHNICAL FIELD

Embodiments of the present application relate to, but are not limited to, the technical field of the Internet, in particular to a method for managing data asset in a data bank and a data bank system.

BACKGROUND ART

Data is basic means of production of the digital economy. The data is gradually capitalized and becomes an important asset in cyberspace. Data assets are data owned or controlled by individuals, enterprises and organizations, which can bring economic benefits to individuals, enterprises and organizations. For example, data assets may be data with asset value such as photos, videos, edited documents, electronized design drawings, and various business solutions.

The data bank is a system that relies on a distributed data center network and integrates a large number of different types of computing devices and storage devices in the network to work together through the application software, thus forming a system that provides storage and services for data assets. However, due to lack of a safe and reliable data asset management mechanism, it is difficult to give full play to the value of the data assets.

SUMMARY

In view of this, embodiments of the present application provide a method for managing data asset in a data bank and a data bank system, which can realize data asset management that is safe and reliable.

The following is an overview of the subject matter described in detail in this document. This summary is not intended to limit the scope of protection of the claims.

The embodiments of the present application mainly provide the following technical solution:

In a first aspect, an embodiment of the present application provides a method for managing data asset in a data bank, which includes: acquiring a confirmation authentication request wherein the confirmation authentication request includes a data asset to be confirmed, characteristic information of the data asset and characteristic information of a data provider which are uploaded by the data provider; in response to the confirmation authentication request, perform a confirmation verification on the data asset through a confirmation blockchain based on the data asset, the characteristic information of the data asset and the characteristic information of the data provider; storing confirmation information corresponding to the data asset into the confirmation blockchain after it is determined that the data asset has passed the confirmation verification; inserting identification data for tracing a data owner into the data asset, and obtaining and storing the data asset having the identification data; wherein confirmation information corresponding to the data asset is obtained according to the characteristic information of the data asset and the characteristic information of the data provider, and the identification data is obtained according to the data asset.

In a second aspect, an embodiment of the present application provides a computer device, which includes at least one processor, and at least one memory and a bus which are connected with the processor; wherein the processor and the memory achieve communication between each other through the bus, and the processor is configured to call program instructions in the memory to execute the steps of the method for managing data asset in a data bank.

In a third aspect, an embodiment of the present application provides a computer-readable storage medium, which includes: a stored program, wherein when the program is run, a computer device in which the storage medium is located is controlled to execute the method for managing data asset in a data bank.

In a fourth aspect, an embodiment of the present application provides a data bank system, which includes a confirmation blockchain system and a secure storage system, wherein the confirmation blockchain system is configured to acquire a confirmation authentication request, wherein the confirmation authentication request includes a data asset to be confirmed, characteristic information of the data asset and characteristic information of a data provider uploaded by the data provider; perform a confirmation verification on the data asset through a confirmation blockchain based, the characteristic information of the data asset and the characteristic information of the data provider in response to the confirmation authentication request; store confirmation information corresponding to the data asset into the confirmation blockchain after determining that the data asset passes the confirmation verification; wherein the confirmation information corresponding to the data asset is obtained according to the characteristic information of the data asset and the characteristic information of the data provider; the secure storage system is configured to insert identification data for tracing data owners into the data asset, obtain and store the data asset having the identification data; wherein the identification data is obtained according to the data asset.

According to the method for managing data asset management in a data bank and the data bank system according to the embodiments of the present application, after obtaining a confirmation authentication request, wherein the confirmation authentication request includes a data asset to be confirmed, characteristic information of the data asset and characteristic information of a data provider which are uploaded by the data provider; in response to the confirmation authentication request, a confirmation verification may be performed on the data asset through a confirmation blockchain based on the data asset, the characteristic information of the data asset and the characteristic information of the data provider. Then, after determining that the data asset has passed the confirmation verification, the confirmation information corresponding to the data asset is stored in the confirmation blockchain, and the identification data for tracing a data owner is inserted into the data asset to obtain and store the data asset having the identification data; wherein, the confirmation information corresponding to the data asset is obtained according to the characteristic information of the data asset and the characteristic information of the data provider; and the identification data is obtained according to the data asset. In this way, on one hand, the confirmation verification is performed through the blockchain, and after the confirmation verification is passed, the confirmation information corresponding to the data asset is stored through the blockchain. Due to the basic characteristics of the blockchain, the confirmation process of the data asset and the confirmation information corresponding to the data asset may obtain strong credibility and effective support. On the other hand, after the confirmation verification is passed, the data asset in which the identification data for tracing the data owner is inserted is stored. Because the real data owner may be traced by the identification data, the data asset may be prevented from being illegally possessed to a certain extent, and the rights and interests of the data owner may be protected. Therefore, safe and reliable data asset management can be realized.

Other features and advantages of the present application will be set forth in the following description, and in part will be apparent from the description, or may be learned by practice of the present application. Other advantages of the present application may be realized and obtained by the solutions described in the specification and the drawings.

BRIEF DESCRIPTION OF DRAWINGS

The accompanying drawings are used to provide an understanding of the technical solution of the present application, and constitute a part of the specification. They are used to explain the technical solution of the present application together with the embodiments of the present application, and do not constitute a restriction on the technical solution of the present application.

DETAILED DESCRIPTION

The technical solution in the embodiments of the present application will be clearly and completely described in the following with reference to the accompanying drawings in the embodiments of the present application.

Figure 1:
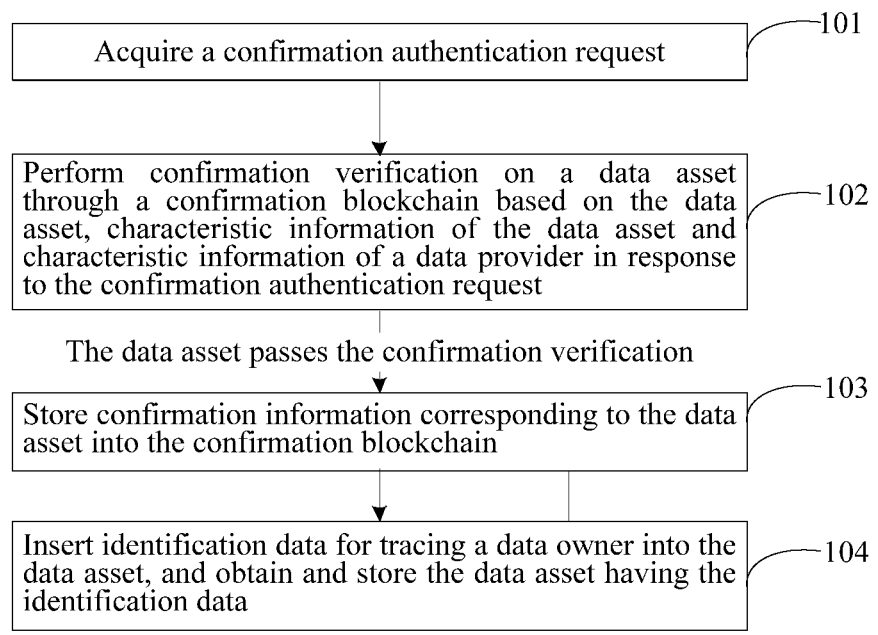
FIG. 1 is a flowchart of a method for managing data asset in a data bank in an embodiment of the present application.

An embodiment of the present application provides a method for managing data asset in a data bank. FIG. 1 is a flowchart of the method for managing data asset in a data bank in the embodiment of the present application. As shown in FIG. 1, the method for managing data asset may include:

Step 101: acquiring a confirmation authentication request.

The confirmation authentication request may include a data asset to be confirmed, characteristic information of the data asset and characteristic information of a data provider uploaded by the data provider to the data bank.

Figure 2:
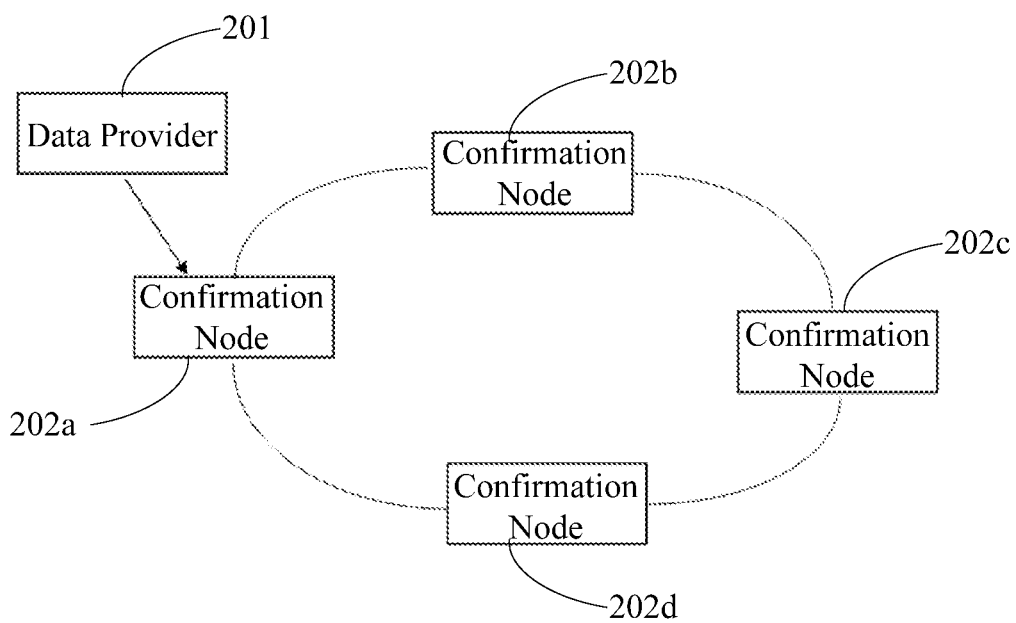
FIG. 2 is a schematic diagram of a confirmation blockchain in an embodiment of the present application.

As an example, as shown in FIG. 2, when the data provider 201 wants to perform a confirmation authentication on the data asset owned or controlled by itself, the data provider 201 may make a confirmation authentication request to a certain confirmation node 202a in the confirmation blockchain.

Step 102: in response to the confirmation authentication request, performing a confirmation verification on the data asset through a confirmation blockchain based on the data asset, the characteristic information of the data asset and the characteristic information of the data provider.

After determining that the data asset has passed the confirmation verification, steps 103 to 104 may be performed.

Step 103: storing confirmation information corresponding to the data asset in the confirmation blockchain.

The confirmation information corresponding to the data asset may be obtained according to the characteristic information of the data asset and the characteristic information of the data provider.

Step 104: inserting identification data for tracing a data owner into the data asset, and acquiring and storing the data asset having the identification data.

The identification data may be obtained according to the data asset.

Here, the data owner of the data asset may refer to a user who has an ownership to the data asset.

In an exemplary embodiment, step 102 may include: detecting whether there is identification data in the data asset through a confirmation node in the confirmation blockchain; wherein if there is no identification data in the data asset, a consensus verification is performed on the data asset according to a consensus mechanism of the confirmation blockchain based on the characteristic information of the data asset and the characteristic information of the data provider through the confirmation node and other confirmation nodes in the confirmation blockchain.

In an exemplary embodiment, the confirmation blockchain may be a Consortium Blockchain.

In an exemplary embodiment, the consensus mechanism supported by the confirmation blockchain may be a consensus algorithm such as Practical Byzantine Fault Tolerance (PBFT).

In an exemplary embodiment, if there is no identification data in the data asset and the data asset has passed the consensus verification, it may be determined that the data asset passes the confirmation verification.

As an example, the confirmation node in the confirmation blockchain grasps a distribution point of the identification data in a data tracing method, and may determine whether the data asset is a data asset with an owner stored in the data bank by performing identification data detection on the obtained data asset to be confirmed. Next, if the confirmation node detects no identification data at the distribution point of the identification data of the data asset, it indicates that there is no identification data in the data asset, that is to say, the data asset may be considered as new data. Then each confirmation node in the confirmation blockchain may perform a consensus verification to the data asset based on the characteristic information of the data asset and the characteristic information of the data provider. That is, a certain confirmation node determines whether the owner of the data asset is the data provider that initiated the confirmation authentication request based on the characteristic information of the data asset and the characteristic information of the data provider, and generates the confirmation information corresponding to the data asset. Then, the confirmation node publishes the confirmation in the confirmation blockchain such that other confirmation nodes in the confirmation blockchain determine whether the owner of the data asset is the data provider that initiated the confirmation authentication request based on the characteristic information of the data asset and the characteristic information of the data provider, and generates the confirmation information corresponding to the data asset, until most confirmation nodes in the confirmation blockchain reach a consensus that the owner of the data asset is the data provider that initiated the confirmation authentication request, that is, the consensus mechanism of the confirmation blockchain is met. Then the confirmation information corresponding to the data asset is stored in the confirmation blockchain to add the confirmation information corresponding to the data asset into a confirmation blockchain ledger, thus a confirmation verification process of the data asset is completed. In this way, because the data or information stored in the confirmation blockchain has the basic characteristics of the blockchain such as being tamper-resistant, traceable and collectively maintained, it is notarized, safe and credible to verify the data owner of the data asset and record the confirmation information of the data asset (including the characteristic information of the data asset and the characteristic information of the owner corresponding to the data asset) through the confirmation blockchain.

In addition, if the confirmation node detects the identification data at the distribution point of the identification data of the data asset, it indicates that there is identification data in the data asset, that is to say, the data asset is a copy of existing data. At this time, the confirmation of the data asset may be rejected, indicating that the owner of the data asset is another data provider which is not the data provider that initiated the confirmation authentication request at this time.

For example, taking the confirmation blockchain as shown in FIG. 2 as an example, the confirmation blockchain may include 4 confirmation nodes (which are confirmation node 202a, confirmation node 202b, confirmation node 202c, and confirmation node 202d respectively). Then, when at least 3 confirmation nodes jointly confirm that the owner of the data asset is the data provider, it may be determined that the data asset has passed the confirmation verification. Until this time, the confirmation information corresponding to the data asset may be stored in the confirmation blockchain to add the confirmation information corresponding to the data asset into the confirmation blockchain ledger.

In an exemplary embodiment, step 104 may include: Step 1041: generating, based on the data asset, the identification data corresponding to the data asset for tracing the data owner;

Step 1042: inserting the identification data for tracing the data owner into the data asset to obtain the data asset having the identification data; and Step 1043: storing the obtained data asset having the identification data.

In an exemplary embodiment, step 1041 may include: dividing the data asset into multiple data blocks; calculating a checksum corresponding to each data block respectively based on each data block; determining the checksum corresponding to each data block as the identification data corresponding to the data asset.

In an exemplary embodiment, if the data asset includes multiple data blocks, and the identification data corresponding to the data asset includes the checksum corresponding to each data block, then step 1042 may include inserting the checksum corresponding to each data block into the data block to obtain the data asset having the identification data.

In another exemplary embodiment, step 1041 may include steps 1041a-1041b: step 1041a: generating a random number corresponding to the data asset based on the data asset; step 1041b: acquiring the identification data corresponding to the data asset based on the random number corresponding to the data asset and a preset mapping table.

In an exemplary embodiment, if the data asset includes multiple data entries, taking the identification data as a new data entry as an example, step 1041a may include: calculating a random number corresponding to the data asset based on any one data entry in the data asset; acquiring a corresponding number of the random number corresponding to the data asset in the preset mapping table based on the random number corresponding to the data asset and a length of the preset mapping table; acquiring the identification data corresponding to the number from the preset mapping table according to the corresponding number of the random number corresponding to the data asset in the preset mapping table; and determining the identification data corresponding to the corresponding number of the random number corresponding to the data asset in the preset mapping table, as the identification data corresponding to the data asset.

Illustratively, the random number corresponding to the data asset may be calculated by a hash algorithm. For example, the random number corresponding to the data asset is obtained by operating a character string corresponding to a certain data entry by a Hash-based Message Authentication Code (HMAC) algorithm.

For example, taking a data asset being multi-attribute data including age attribute, gender attribute, location attribute and consumption amount attribute as an example, it is assumed that the data asset includes data entry 1 and data entry 2, and it is assumed that the preset mapping table includes a data entry code table as shown in Table 1. Then, for data entry 1, a random number 10 is obtained by operating data entry 1 through a HMAC algorithm using a preset secret value K. A number 2 of the data entry is obtained by performing a remainder operation on the length of the data entry code table (for example, the length of the last name code table in Table 1 is 4) using the random number 10; and data entry 3 corresponding to this number is acquired from the data entry code table. Finally, data entry 3 is inserted into the data asset, so that the data asset having the identification data may be obtained.

TABLE 1

Data entry code table

| Data entry | Number of the data entry |
|---|---|
| Data entry 1 | 0 |
| Data entry 2 | 1 |
| Data entry 3 | 2 |
| Data entry 4 | 3 |

In an exemplary embodiment, if the data asset includes multiple data entries, and each data entry includes attribute values corresponding to multiple attributes, then taking the identification data as an attribute value corresponding to a new attribute as an example, step 1041a may include: connecting the attribute values included in each data entry to obtain a character string corresponding to each data entry; calculating a random number corresponding to each data entry based on the character string corresponding to each data entry; and determining the random number corresponding to each data entry as the random number corresponding to the data asset.

Illustratively, the random number corresponding to each data entry may be calculated by a hash algorithm. For example, the random number corresponding to each data entry may be obtained by performing an operation to the character string corresponding to each data entry through a HMAC algorithm.

In an exemplary embodiment, if the data asset includes multiple data entries and the random number corresponding to the data asset includes the random number corresponding to each data entry, then step 1041b may include: obtaining the identification data corresponding to each data entry based on the random number corresponding to each data entry and the preset mapping table; and determining the identification data corresponding to each data entry as the identification data corresponding to the data asset.

In an exemplary embodiment, the step of obtaining the identification data corresponding to each data entry based on the random number corresponding to each data entry and the preset mapping table may include: obtaining a number corresponding to each random number in the preset mapping table based on the random number corresponding to each data entry and a length of the preset mapping table; acquiring identification data corresponding to the number corresponding to each random number from the preset mapping table according to the number corresponding to each random number in the preset mapping table; and determining the identification data corresponding to the number corresponding to each random number as the identification data corresponding to the data entry corresponding to each random number.

In an exemplary embodiment, if the data asset includes multiple data entries, and the identification data corresponding to the data asset includes the identification data corresponding to each data entry, then step 1042 may include inserting the identification data corresponding to each data entry into each data entry to obtain the data asset having the identification data.

For example, taking a data asset being multi-attribute data including age attribute, gender attribute, location attribute and consumption amount attribute as an example, it is assumed that data asset includes data entry 1 and data entry 2, wherein data entry 1 includes age 11, gender 12, location 13 and consumption amount 14, and data entry 2 includes age 21, gender 22, location 23 and consumption amount 24. A new attribute is a name attribute, and it is assumed that a preset mapping table includes a last name code table as shown in table 2 and a first name code table as shown in table 3. Then, for data entry 1, age 11, gender 12, location 13 and consumption amount 14 are connected to obtain a character string 15. An operation is performed on the character string 15 through a HMAC algorithm using a preset secret value K to obtain a random number 16. The random number 16 is divided into a value 161 and a value 162. A remainder operation is performed on a length of the last name code table (for example, the length of the last name code table of Table 2 is 4) by the value 161 to obtain a number of a target last name. A target last name corresponding to the number of the target last name is acquired from the last name code table. A remainder operation is made to a length of the first name code table (for example, the length of the last name code table of Table 3 is 4) by the value 162 to obtain a number of a target first name. A target first name corresponding to the number of the target first name is acquired from the first name code table. The identification data corresponding to the data entry 1 may be obtained by connecting the obtained target last name and the obtained target first name. Similarly, the identification data corresponding to the data entry 2 may be obtained. Finally, the identification data corresponding to data entry 1 is inserted into data entry 1, and the identification data corresponding to data entry 2 is inserted into data entry 2, so that the data asset having the identification data may be obtained.

For example, taking Wang Yiyi corresponding to data entry 1 and Zhang Sansan corresponding to data entry 2 as an example, the data asset having the identification data may include data entry 1 having identification data and data entry 2 having identification data, wherein data entry 1 having the identification data includes Wang Yiyi, age 11, gender 12, location 13 and consumption amount 14, and data entry 2 having the identification data includes Zhang Sansan and Zhang Sansan, age 21, gender 22, location 23 and consumption amount 24.

TABLE 2

Last name code table

| Last name | Number of last name |
|---|---|
| Zhang | 0 |
| Wang | 1 |
| Li | 2 |
| Zhao | 3 |

TABLE 3

First name code table

| First name | Number of first name |
|---|---|
| Yiyi | 0 |
| Erer | 1 |
| Sansan | 2 |
| Sisi | 3 |

In an exemplary embodiment, step 1042 may include inserting the identification data into the data asset according to a preset step size or a random step size to obtain the data asset having the identification data.

Here, the preset step size may be configured according to experience by a person skilled in the art.

In an exemplary embodiment, after step 104, the method may further include trading the data asset through a trading blockchain to realize a trading of the data asset, or trading the data asset through a third-party trading platform, so as to realize the trading of the data asset.

In an exemplary embodiment, after step 104, the method may further include canceling the confirmation verification of the data asset.

As an example, canceling the confirmation verification of the data asset may include announcing a cancellation of the confirmation verification of the data asset through a confirmation blockchain system and deleting the data asset having the identification data.

It can be seen from the above contents that in the method for managing data asset according to the embodiment of the present application, after obtaining the confirmation authentication request, wherein the confirmation authentication request includes the data asset to be confirmed, the characteristic information of the data asset and the characteristic information of the data provider uploaded by the data provider; a confirmation verification is performed on the data asset through the confirmation blockchain based on the data asset, the characteristic information of the data asset and the characteristic information of the data provider in response to the confirmation authentication request. Then, after determining that the data asset has passed the confirmation verification, the confirmation information corresponding to the data asset is stored in the confirmation blockchain, and the identification data for tracing the data owner is inserted into the data asset to obtain and store the data asset having the identification data. The confirmation information corresponding to the data asset is obtained according to the characteristic information of the data asset and the characteristic information of the data provider and the identification data is obtained according to the data asset. In this way, on one hand, the confirmation verification is performed through the blockchain, and after the confirmation verification is passed, the confirmation information corresponding to the data asset is stored through the blockchain. Due to the basic characteristics of the blockchain, the confirmation process of the data asset and the confirmation information corresponding to the data asset may obtain strong credibility and effective support. On the other hand, after the confirmation verification is passed, the data asset in which the identification data for tracing the data owner is inserted is stored. Because the real data owner may be traced by the identification data, the data asset may be prevented from being illegally possessed to a certain extent, and the rights and interests of the data owner may be protected. Therefore, safe and reliable data asset management may be realized.

Figure 3:
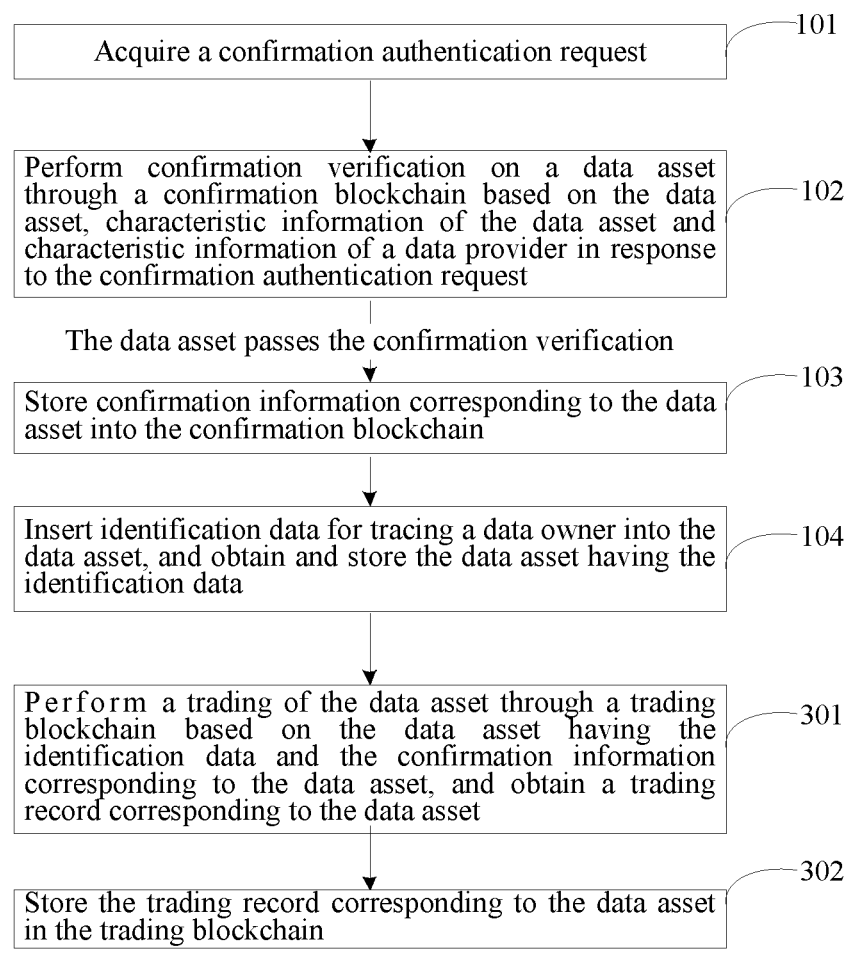
FIG. 3 is another flowchart of a method for managing data asset in a data bank in an embodiment of the present application.

Based on the same inventive concept, an embodiment of the present application provides a method for managing data asset. FIG. 3 is another flowchart of a method for managing data asset in a data bank in an embodiment of the present application. As shown in FIG. 3, after step 104, the above method may further include:

Step 301: trading the data asset through a trading blockchain based on the data asset having the identification data and the confirmation information corresponding to the data asset, and obtaining a trading record corresponding to the data asset.

Step 302: storing the trading record corresponding to the data asset in the trading blockchain.

As an example, when a data demander needs to use the data asset, the data demander may issue a trading request in the trading blockchain for applying for a usage right of the data asset through a node device of the data demander. Next, a trading node in the trading blockchain may obtain a trading demand of a data owner of the data asset and price the data asset according to the trading demand, and sends a pricing result to the node device of the data demander. If the data demander determines that the trading may be performed, the data demander may pay usage fee to the trading node in the trading blockchain through the node device of the data demander. Then, the trading node in the trading blockchain grants the usage right of the data asset to the node device of the data demander, that is, the node device of the data demander can access the data asset. Finally, the trading node in the trading blockchain deduct preset handling fees (such as expenses for maintaining storage, confirmation, etc.) from the obtained usage fee, and send obtained remaining fee to the node device of the data owner. In this way, every usage process of the data asset is notarized through the blockchain, thus ensuring a safe circulation of the data asset. Next, the trading record corresponding to the data asset is stored in the trading blockchain, so that mortgage and securitization of the data asset may be realized later according to the trading record of the data asset. In this way, the circulation of the data asset may be improved through safe and credible data asset management, so that the value of the data asset may be brought into play and the value of the data asset may be increased and preserved.

Figure 4:
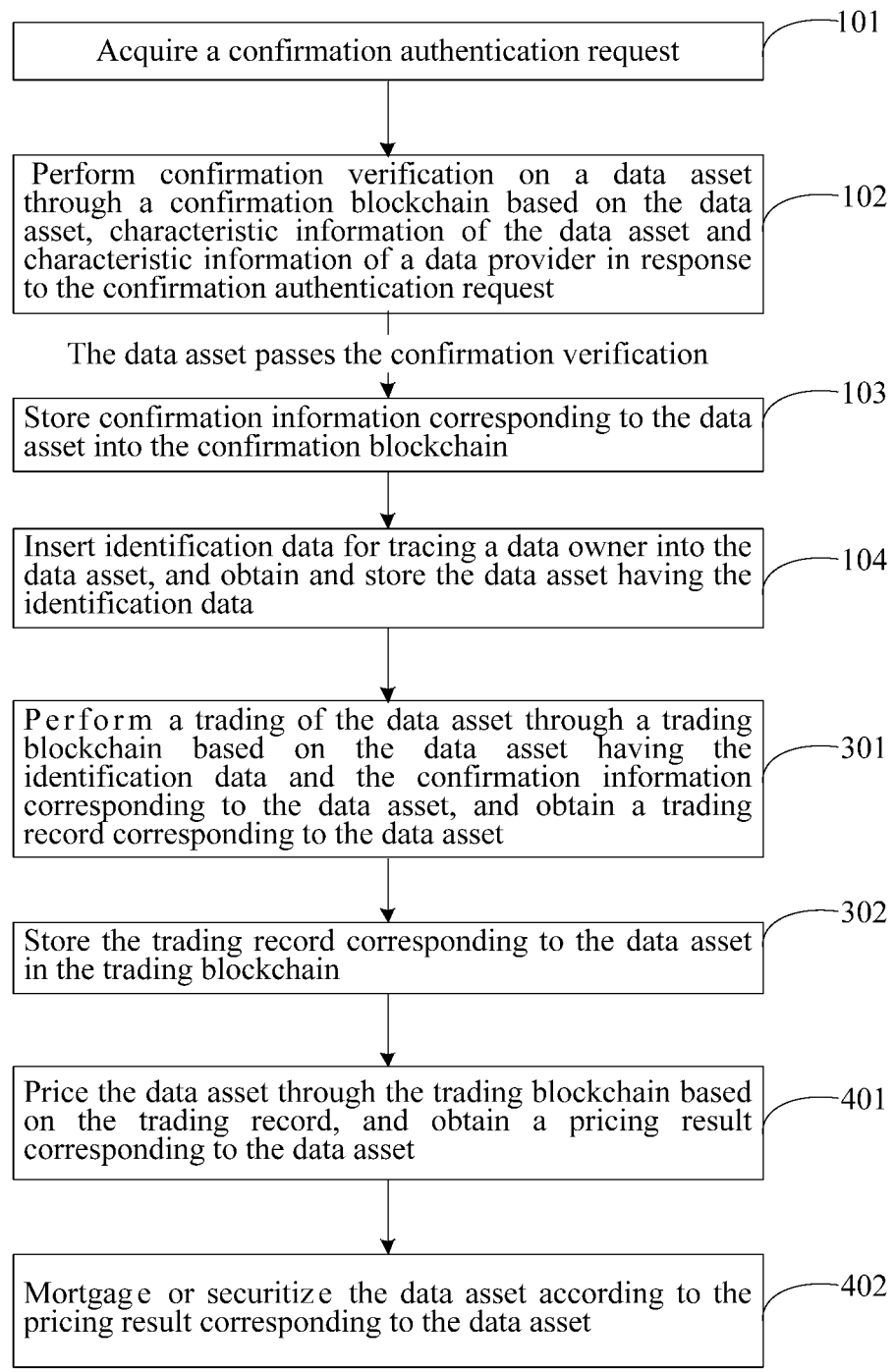
FIG. 4 is another flowchart of a method for managing data asset in a data bank in an embodiment of the present application.

Based on the same inventive concept, an embodiment of the present application provides a method for managing data asset. FIG. 4 is another flowchart of a method for managing data asset in a data bank in an embodiment of the present application. As shown in FIG. 4, after step 302, the above method may further include:

Step 401: pricing the data asset through a trading blockchain based on the trading record to obtain a pricing result corresponding to the data asset.

Step 402: mortgaging or securitizing the data asset according to the pricing result corresponding to the data asset.

In an exemplary embodiment, securitization of the data asset may refer to converting the data asset into securitized asset such as bonds and funds.

As an example, a pricing participant prices the data asset by bidding based on the trading record of the data asset stored in the trading blockchain through a node device of the pricing participant. After the pricing result provided by the pricing participant passes a consensus verification by the trading node in the trading blockchain, the pricing result corresponding to the data asset is stored in the trading blockchain. Finally, the data asset may be mortgaged or securitized based on the pricing result corresponding to the data asset stored in the trading blockchain. In this way, a voucher and a basis may be provided for the pricing of the data asset based on the trading record corresponding to the data asset stored in the trading blockchain. After the pricing of the data asset, the pricing result corresponding to the data asset stored in the trading blockchain may provide voucher and basis for the mortgage or the securitization of the data asset. In this way, the circulation of the data asset may be improved through safe and credible data asset management, so that the value of data asset may be brought into play and the value of the data asset may be increased and preserved.

Figure 5:
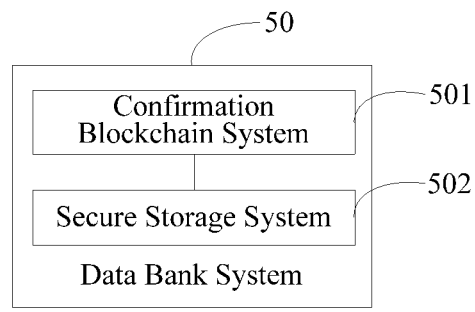
FIG. 5 is a schematic diagram of a structure of a data bank system in an embodiment of the present application.

Based on the same inventive concept, an embodiment of the present application provides a data bank system. FIG. 5 is a schematic diagram of a structure of a data bank system in an embodiment of the present application. As shown in FIG. 5, the data bank system 50 may include a confirmation blockchain system 501 and a secure storage system 502, wherein the confirmation blockchain system 501 is configured to acquire a confirmation authentication request, wherein the confirmation authentication request includes a data asset to be confirmed, characteristic information of the data asset and characteristic information of a data provider which are uploaded by the data provider; perform a confirmation verification on the data asset through a confirmation blockchain based on the data asset, the characteristic information of the data asset and the characteristic information of the data provider in response to the confirmation authentication request; and store confirmation information corresponding to the data asset in the confirmation blockchain after determining that the data asset has passed the confirmation verification; wherein the confirmation information corresponding to the data asset is obtained according to the characteristic information of the data asset and the characteristic information of the data provider.

The secure storage system 502 is configured to insert identification data for tracing a data owner into the data asset, and obtain and store the data asset having the identification data, wherein the identification data is obtained according to the data asset.

In an exemplary embodiment, the confirmation blockchain system 501 is configured to detect whether there is identification data in the data asset through a confirmation node in the confirmation blockchain; and perform a consensus verification on the data asset according to a consensus mechanism of the confirmation blockchain based on the characteristic information of the data asset and the characteristic information of the data provider through the confirmation node and other confirmation nodes in the confirmation blockchain if there is no identification data in the data asset.

In an exemplary embodiment, the secure storage system is configured to divide the data asset into multiple data blocks; calculate a checksum corresponding to each data block respectively based on each data block; and determine the checksum corresponding to each data block as the identification data. The confirmation blockchain system is configured to insert the checksum corresponding to each data block into each data block respectively to obtain the data asset having the identification data.

In an exemplary embodiment, the secure storage system is configured to generate a random number corresponding to the data asset based on the data asset; and obtain the identification data based on the random number corresponding to the data asset and a preset mapping table.

In an exemplary embodiment, the confirmation blockchain system is configured to insert the identification data into the data asset according to a preset step size or a random step size.

In an exemplary embodiment, the data bank system may further include a trading blockchain, which is configured to perform trading of the data asset through a trading blockchain based on the data asset having the identification data and the confirmation information corresponding to the data asset and obtain a trading record corresponding to the data asset; and store the trading record corresponding to the data asset in the trading blockchain.

In an exemplary embodiment, the trading blockchain is further configured to price the data asset through the trading blockchain based on the trading record, so as to obtain a pricing result corresponding to the data asset; and perform mortgage or securitization of the data asset according to the pricing result corresponding to the data asset.

Figure 6:
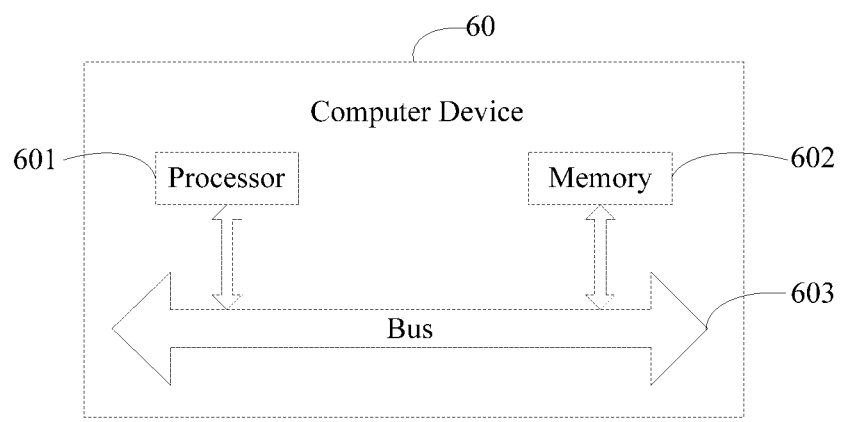
FIG. 6 is a schematic diagram of a structure of a computer device in an embodiment of the present application.

Based on the same inventive concept, an embodiment of the present application provides a computer device. FIG. 6 is a schematic diagram of a structure of a computer device in an embodiment of the present application. Referring to FIG. 6, the computer device 60 includes at least one processor 601, and at least one memory 602 and a bus 603 connected with the processor 601; wherein the processor 601 and the memory 602 communicate with each other through the bus 603, and the processor 601 is configured to call program instructions in the memory 602 to execute the steps of the method for managing data asset in a data bank in one or more embodiments described above.

The above processor can be realized by a Central Processing Unit (CPU), a Micro Processor Unit (MPU), a Digital Signal Processor (DSP), or a Field Programmable Gate Array (FPGA). The memory may include non-permanent memory, Random Access Memory (RAM) and/or non-volatile memory in computer readable media, such as Read Only Memory (ROM) or Flash RAM, and the memory includes at least one memory chip.

It should be noted that, in the embodiments of the present application, if the data asset management methods in one or more of the above embodiments are implemented in the form of software function modules and sold or used as independent products, they may also be stored in a computer-readable storage medium. Based on such understanding, the technical solutions of the embodiments of the present application may be embodied in the form of software products, which are stored in a storage medium and include several instructions to make a computer device (which can be a personal computer, a server or a network device, etc.) execute all or part of the methods of the embodiments of the present application.

Accordingly, based on the same inventive concept, an embodiment of the present application further provides a computer-readable storage medium, which includes a stored program, wherein when the program is run, the computer device in which the storage medium is located is controlled to execute the steps of the method for managing data asset in a data bank in one or more embodiments described above.

In practical application, the above computer readable storage medium may be, for example, ROM/RAM, magnetic disk, optical disk, etc.

It should be pointed out here that the description of the above system, computer equipment or computer readable storage medium embodiment is similar to the description of the above method embodiment, and has similar beneficial effects as the method embodiment. For the technical details not disclosed in the embodiments of the system, computer device or computer-readable storage medium in the present application, please refer to the description of the method embodiments of the present application.

This application describes a number of embodiments, but the description is exemplary, not restrictive, and it is apparent to those of ordinary skill in the art that there may be more embodiments and implementations within the scope of the embodiments described in the present application. Although many possible combinations of features are shown in the drawings and discussed in the detailed description, many other combinations of the disclosed features are possible. Unless specifically limited, any feature or element of any embodiment may be used in combination with or instead of any other feature or element of any other embodiment.

Combinations of features and elements known to those of ordinary skill in the art are included and contemplated in the present application. The embodiments, features and elements disclosed in the present application may also be combined with any conventional features or elements to form a unique inventive solution defined by the claims. Any features or elements of any embodiment may also be combined with features or elements from other inventions to form another unique invention defined by the claims. Therefore, it should be understood that any features shown and/or discussed in the present application may be implemented separately or in any suitable combination. Therefore, the embodiments are not limited except those made according to the appended claims and their equivalents. In addition, various modifications and changes may be made within the scope of protection of the appended claims.

In addition, when describing representative embodiments, the description may have presented the method and/or process as a specific sequence of steps. However, to the extent that the method or process does not depend on the specific order of steps herein, the method or process should not be limited to the specific order of steps. As will be understood by those of ordinary skill in the art, other sequences of steps are also possible. Therefore, the specific sequence of steps set forth in the specification should not be interpreted as limiting the claims. In addition, the claims directed to this method and/or process should not be limited to executing their steps in the written order, and those skilled in the art can easily understand that these orders may be changed and still remain within the spirit and scope of the embodiments of the present application. Therefore, in other embodiments, the steps of corresponding methods are not necessarily performed in the order shown and described in this specification. In some other embodiments, the method may include more or fewer steps than those described in the specification. In addition, a single step described in this specification may be decomposed into multiple steps for description in other embodiments. In other embodiments, the steps described in this specification may be combined into a single step for description.

It can be understood by those skilled in the art that all or some of the steps, systems and functional modules/units in the devices disclosed above may be implemented as software, firmware, hardware and appropriate combinations thereof. In the hardware implementation, the division between functional modules/units mentioned in the above description does not necessarily correspond to the division of physical components. For example, a physical component may have multiple functions, or a function or step may be cooperatively performed by several physical components. Some or all of the components may be implemented as software executed by a processor, such as a digital signal processor or a microprocessor, or as hardware, or as an integrated circuit, such as an application specific integrated circuit. Such software can be distributed on computer-readable media, which can include computer storage media (or non-transitory media) and communication media (or transitory media). As well known to those of ordinary skill in the art, the term computer storage medium includes volatile and nonvolatile, removable and non-removable media implemented in any method or technology for storing information such as computer readable instructions, data structures, program modules or other data. Computer storage media include but are not limited to RAM, ROM, EEPROM, flash memory or other memory technologies, CD-ROM, digital versatile disk (DVD) or other optical disk storage, magnetic boxes, magnetic tapes, magnetic disk storage or other magnetic storage devices, or any other media that can be used to store desired information and can be accessed by computers. Furthermore, it is well known to those of ordinary skill in the art that communication media typically contain computer readable instructions, data structures, program modules or other data in a modulated data signal such as a carrier wave or other transmission mechanism, and can include any information delivery media.

What is claimed is:

1. A method implemented using at least one hardware processor by executing a program in a memory for managing data asset in a data bank, the method comprising:
   acquiring a confirmation authentication request, wherein the confirmation authentication request comprises a data asset to be confirmed, characteristic information of the data asset and characteristic information of a data provider which are uploaded by the data provider;
   performing a confirmation verification on the data asset through a confirmation blockchain based on the data asset, the characteristic information of the data asset and the characteristic information of the data provider in response to the confirmation authentication request;
   storing confirmation information corresponding to the data asset into the confirmation blockchain after it is determined that the data asset has passed the confirmation verification; inserting identification data for tracing a data owner into the data asset, obtaining and storing the data asset having the identification data, wherein the confirmation information corresponding to the data asset is obtained according to the characteristic information of the data asset and the characteristic information of the data provider, and the identification data is obtained according to the data asset.

2. The method of claim 1, wherein performing the confirmation verification the data asset through the confirmation blockchain based on the data asset, the characteristic information of the data asset and the characteristic information of the data provider comprises:
   detecting whether there is the identification data in the data asset through a confirmation node in the confirmation blockchain; and
   performing a consensus verification on the data asset according to a consensus mechanism of the confirmation blockchain based on the characteristic information of the data asset and the characteristic information of the data provider through a confirmation node and another confirmation node in the confirmation blockchain, if the identification data does not exist in the data asset.

3. The method of claim 1, wherein that the identification data is obtained according to the data asset comprises: dividing the data asset into a plurality of data blocks; calculating a checksum corresponding to each data block respectively based on each data block; and determining the checksum corresponding to each data block as the identification data;
   inserting the identification data for tracing the data owner into the data asset comprises: inserting the checksum corresponding to each data block into each data block respectively to obtain the data asset having the identification data.

4. The method of claim 1, wherein that the identification data is obtained according to the data asset comprises: generating a corresponding random number based on the data asset; and obtaining the identification data based on the random number and a preset mapping table.

5. The method of claim 1, wherein inserting the identification data for tracing the data owner into the data asset comprises:
   inserting the identification data into the data asset according to a preset step size or a random step size.

6. The method of claim 1, wherein after storing the data asset having the identification data, the method further comprises:
   performing a trading of the data asset through a trading blockchain based on the data asset having the identification data and the confirmation information corresponding to the data asset, obtaining a trading record corresponding to the data asset; and
   storing the trading record corresponding to the data asset into the trading blockchain.

7. The method of claim 6, wherein after storing the trading record corresponding to the data asset into the trading blockchain, the method further comprises:
   pricing the data asset through the trading blockchain based on the trading record, obtaining a pricing result corresponding to the data asset; and
   performing mortgage or securitization of the data asset according to the pricing result corresponding to the data asset.

8. A computer device comprising:
   at least one processor; and
   at least one memory and a bus which are connected with the processor;
   wherein the processor and the memory achieve communication between each other through the bus, and the processor is configured to call program instructions in the memory to execute the steps of the method for managing data asset in a data bank according to claim 1.

9. A non-transitory computer-readable storage medium comprising a stored program, wherein when the program is run, a computer device in which the storage medium is located is controlled to execute the method for managing data asset in a data bank according to claim 1.

10. A data bank system, comprising a confirmation blockchain system and a secure storage system, wherein the confirmation blockchain system is configured to acquire a confirmation authentication request, wherein the confirmation authentication request comprises a data asset to be confirmed, characteristic information of the data asset and characteristic information of a data provider which are uploaded by the data provider; perform a confirmation verification on the data asset through a confirmation blockchain based on the data asset, the characteristic information of the data asset and the characteristic information of the data provider in response to the confirmation authentication request; and store confirmation information corresponding to the data asset into the confirmation blockchain after determining that the data asset has passed the confirmation verification; wherein the determination information corresponding to the data asset is obtained according to the characteristic information of the data asset and the characteristic information of the data provider; and the secure storage system is configured to insert identification data for tracing a data owner into the data asset, obtain and store the data asset having the identification data, wherein the identification data is obtained according to the data asset, wherein the confirmation blockchain system and the secure storage system are implemented using at least one hardware processor and a memory.

\* \* \* \* \*